F. LA BELLE.
BELT SPLICE.
APPLICATION FILED APR. 22, 1913.
1,083,544.
Patented Jan. 6, 1914.
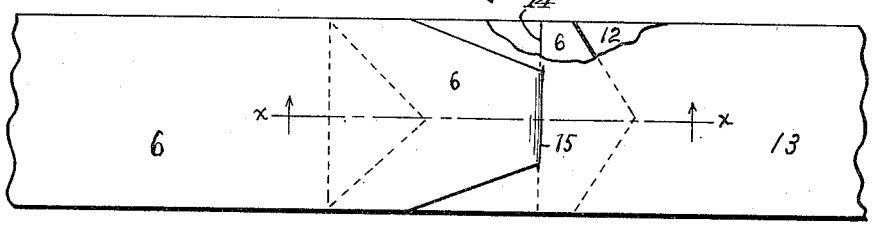
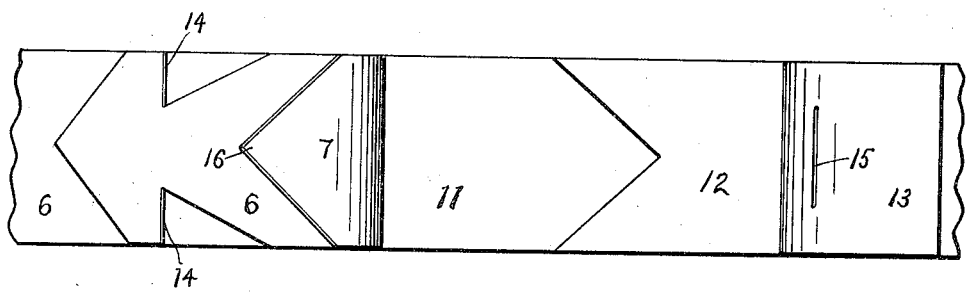
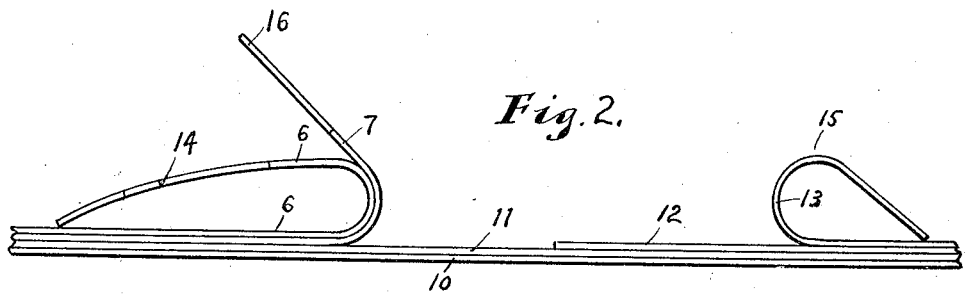
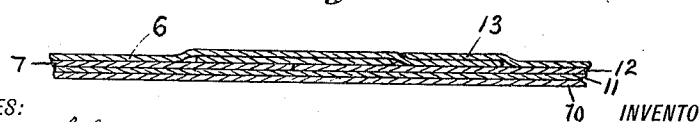
WITNESSES:
H. L. Opsahl.
Theo. Hegdahl
INVENTOR
Frank La Belle
BY
C. D. Haskins
ATTORNEY

UNITED STATES PATENT OFFICE.

FRANK LA BELLE, OF SEATTLE, WASHINGTON.

BELT-SPLICE.

1,083,544.    Specification of Letters Patent.    Patented Jan. 6, 1914.

Application filed April 22, 1913. Serial No. 762,908.

*To all whom it may concern:*

Be it known that I, FRANK LA BELLE, citizen of the United States, residing at Seattle, in the county of King and State of Washington, have invented a certain new and useful Improvement in Belt-Splices, of which the following is a specification.

My invention relates to improvements in splices for belts that are adapted to be embodied in belts made of a plurality of layers or plies of suitable material, and the object of my improvement is to provide a practical and efficient form of splice that may be quickly and easily made to splice such belts as are made of a plurality of layers or plies of material without greatly increasing the thickness of a belt within the spliced portion and which splice shall not present an exposed end to be torn or loosened by its engagement with revolving pulleys.

I attain this object by a form of splice illustrated in the accompanying drawings, wherein—

Figure 1, is a view in side elevation of the two ends of a four ply belt formed to adapt them to be joined to make a splice embodying my invention; Fig. 2, is a view in side elevation of the same after the two lower plies are spliced; Fig. 3 is a plan view of the same belt end shown in Fig. 2; Fig. 4, is a plan view of one side of the spliced portion of the belt after its completion, a portion of the top ply of the belt being broken away to show other portions; and Fig. 5, is a sectional view on the line $x$, $x$ of Fig. 4.

Like reference numerals indicate like parts throughout the several views.

Referring to the drawings, two opposed belt ends of a four ply belt, are shown, one end as composed of plies 6, 7, 8 and 9, and the other end as composed of plies 10, 11, 12 and 13. The longer upper and longer lower plies 6 and 10 respectively each have their ends tapered to a point and each is so cut away on each side near its end as to leave two shoulders 14, 14, thus to form the shape of a barbed arrow-head, as shown in Figs. 3 and 4, while the lower ply 9 and the upper ply 13 are each provided with a transversely slotted hole 15 at a short distance from its end, as shown in Fig. 3, within which holes 15 may be disposed the notched ends of the plies 6 and 11. The plies 7 and 11 respectively are each formed with wedge shaped or pointed ends 16, which wedge shaped ends 16 are adapted to fit within V shaped openings provided in the ends of the plies 12 and 8 respectively.

In forming my belt splice the ends to be spliced are placed together as illustrated in Fig. 1, and the wedge shaped end of the ply 7 is folded downwardly to fit within the V shaped notch in the end of the ply 12. The ply 13 containing the slotted hole 15 is then turned down on the ply 12, the ply 6 is then turned down on said ply 13 and the notched end of the ply 6 is folded and thrust into the slotted hole 15 until the shoulders 14, 14 shall have passed through the hole 15. The end of the ply 6 is then flattened out as illustrated in Fig. 5, the narrowest portion of the end 6 fitting the slotted hole 15, while the shoulders 14, 14 serve to prevent the ply 6 from being withdrawn from the slotted hole 15 and the belt ends from being pulled apart. The lower plies 8, 11, 9 and 10 are then associated in a manner similar to that of the corresponding upper plies and the several plies embodied in the splice are then securely cemented together to complete the splice.

Obviously my invention is not limited in its scope to a four ply belt but may be advantageously embodied in any belt that is made up of a plurality of plies, the plies interposed between the two outside plies having their ends so formed that the wedge shaped end of the one shall fit the V shaped end of the corresponding opposed ply, said plies varying in length so that no two joined ends shall register with any other two like joined ends when the splice is completed.

What I claim is:

In a belt composed of a plurality of plies of material, a belt splice wherein one end portion of the outer ply of each side of said belt is shaped substantially like a barbed arrow-head while the other end portion of such outer ply of each side of said belt is provided with a transverse slot adapted to receive and securely hold the corresponding barbed arrow-head shaped end portion to unite said end portions, the ends of each of the interior plies being formed one in shape of a wedge and the other in shape of the letter V, whereby the wedge shaped end portion may be disposed within the V shaped end portion.

In witness whereof, I, hereunto subscribe my name this 31st day of March A. D., 1913.

FRANK LA BELLE.

Witnesses:
A. HASKINS,
GEO. BLAIR.

Copies of this patent may be obtained for five cents each, by addressing the "Commissioner of Patents, Washington, D. C."